United States Patent Office.

DANIEL THACKARA, OF WOODBURY, NEW JERSEY.

Letters Patent No. 97,992, dated December 14, 1869.

IMPROVEMENT IN MAKING BRICKS, TILES, &c.

The Schedule referred to in these Letters Patent and making part of the same.

*To all whom it may concern:*

Be it known that I, DANIEL THACKARA, of Woodbury, in the county of Gloucester, and State of New Jersey, have invented or discovered a new and useful Improvement in Making Bricks, Tiles, and other Earthenware; and I do hereby declare that the following is a full and exact description thereof.

My invention or discovery consists in the manufacture of bricks, tiles, and other earthenware, from sediments or settlings which have been deposited on the beds of rivers or other streams of water, or upon their shores by the overflowing of the streams, and is commonly regarded as mud.

Hitherto, clay and loam, found in beds, have constituted the principal ingredients in the manufacture of such ware, it not being known that the material above named is adapted to the purpose; and, consequently, the crude material for their manufacture has often been procured at great expense, in consequence of its scarcity, or the difficulty in getting it.

In thus utilizing the material above named, the manufactured articles may often be furnished at a diminished price, and, besides, the localities whence the material is taken may be greatly improved.

My invention or discovery will be more fully understood by the following description.

I take the sediments or settlings which have been deposited on the beds of rivers or other streams of water, or on their shores by the overflowing of the streams, and is usually called "mud." A small quantity of sand or loam may be added, sometimes, to advantage. I then mould or otherwise form the bricks, tiles, or other articles to be manufactured, in any of the known ways, and burn them in the usual manner.

This material is found in abundance at and about League island, below the city of Philadelphia; on Cooper's creek, above Camden, New Jersey; on Mantua creek, below Camden, and other creeks and rivers which have flat or slightly-inclined shores.

It must clearly appear that the utilizing of a material which has not been known to be adapted to this use in the arts is a great desideratum in places where it may be procured in abundance, if clay and loam are held at high prices, or are obtained with difficulty.

In many localities, the latter materials do not exist at all, or in requisite quantity. In such case, the value of the material in question to the use propose is greatly enhanced.

I do not claim the use of the blue or yellow "swamp-clay," as that is quite a different material but

What I claim as my invention or discovery, is—

The manufacture of bricks, tiles, and other earthenware, from the sediments or settlings which have been deposited on the beds of rivers and other streams of water, or on their shores by the overflowing of the streams, and is commonly called "mud," as above set forth.

In testimony that the above is my invention or discovery, I have hereunto set my hand, and affixed my seal, this 27th day of April, 1869.

DANIEL THACKARA. [L. S.]

Witnesses:
STEPHEN USTICK,
WM. LARZELERE.